United States Patent

Tsubuku

[11] Patent Number: 5,879,804
[45] Date of Patent: Mar. 9, 1999

[54] COMPOSITE POWDER AND MANUFACTURING THEREOF FOR FORMING FLUORO RESIN SURFACE COATING

[75] Inventor: Yukihisa Tsubuku, Hanyu, Japan

[73] Assignee: K.K. Seishin Kigyo, Tokyo, Japan

[21] Appl. No.: 965,152

[22] Filed: Nov. 6, 1997

[51] Int. Cl.$^6$ ....................................................... B32B 5/16
[52] U.S. Cl. ............................ 428/402; 428/336; 525/199
[58] Field of Search ..................................... 428/402, 336; 525/199

[56] References Cited

U.S. PATENT DOCUMENTS

| | | | |
|---|---|---|---|
| 4,575,533 | 3/1986 | Horie et al. | 525/199 |
| 4,898,779 | 2/1990 | Yoshimura et al. | 525/199 |
| 4,914,158 | 4/1990 | Yoshimura et al. | 525/199 |
| 5,229,460 | 7/1993 | Yousuf et al. | 525/199 |
| 5,320,905 | 6/1994 | Vaughn et al. | 428/402 |
| 5,380,803 | 1/1995 | Coutant et al. | 525/199 |

*Primary Examiner*—Bernard Lipman
*Assistant Examiner*—N. Sarofin
*Attorney, Agent, or Firm*—Oblon, Spivak, McClelland, Maier & Neustadt, P.C.

[57] ABSTRACT

The composite resin powder having particle diameter range capable of being applied by way of fluidization dipping or electrostatic spray coating for forming a fluoro resin surface coating which melts at a lower temperature. 3.0 to 20 parts by weight of EAA resin is added to 100 parts by volume of xylene (86 parts by weight), the mixture is heated at 120° to 125° C. with stirring to dissolve, simultaneously PTFE powder with a particle diameter of 5 to 50 μm is added in an amount of 5 to 25% by weight to that of said EAA resin, then the temperature of the mixture was cooled to a temperature of 40° C. or lower to generate particles.

2 Claims, 1 Drawing Sheet

COMPOSITE POWDER AND MANUFACTURING THEREOF FOR FORMING FLUORO RESIN SURFACE COATING

BACKGROUND OF THE INVENTION

1. Field of the Invention

This invention relates to a composite resin powder and manufacturing thereof for forming tetrafluoroethylene surface coating on a metal surface by way of fluidization dipping or electrostatic spray coating.

2. Description of the Prior Art

A composite resin comprising a mixture of tetrafluoroethylene particles in modified saturated polyester resin has been known as a composite powder for forming tetrafluoroethylene (PTFE) polymer surface coating which adheres on a metal surface applied by heat melting (Japanese Patent Laid-Open Publication No. 4-339828).

Though this composite powder adheres to the metal surface, the composite is expensive and requires a special high-temperature stove for applying it. In detail, it is necessary to heat a coating surface to a temperature as high as 320° C. or higher in stoving treatment of the composite powder, and to realize this stoving condition, a high-temperature stove which is capable of being maintained at a temperature of as high as 450° C. or higher in the stove, such temperature is higher than normal temperature, is required, and this requirement leads to high processing cost. Further, mixed solvent is used as a solvent, and the mixed solvent involves disadvantageously troublesome solvent recovery.

SUMMARY OF THE INVENTION

The present invention has been made in view of the foregoing disadvantage of the prior art.

It is an object of the present invention to provide a composite resin powder for forming Teflon coating which is excellent in adherence to metal surface and is inexpensive in stoving treatment cost, and further it is another object of the present invention to provide a manufacturing method in which a single solvent is used as the solvent for easy recycling.

The composite resin powder for double-layered coating in accordance with the present invention contains 5 to 25% by weight of PTFE powder with particle diameter of 5 to 50 $\mu$m in EAA resin (ethylene acrylic acid copolymer resin) and is powder with particle diameter of 10 to 300 $\mu$m as a whole, which composite resin powder having such particle diameter range can be applied not only by fluidization dipping but also by electrostatic spray coating, and the composite resin powder melts at a lower temperature and adheres to metal surface and forms a coating having a PTFE lubricative surface. Particle diameter of PTFE to be blended should be 50 $\mu$m or smaller in view of the relation to the product particle diameter.

PTFE percentage of 5% by weight or lower mixed in EAA resin is not effective, on the other hand, PTFE percentage of higher than 30% by weight results in partial aggregation of PTFE particles and results in rough surface layer due to the aggregation, and the object of the present invention for forming lubricated surface layer is not achieved.

The method for manufacturing the composite powder involves a process in which 3.0 to 20 parts by weight of EAA resin is added to 100 parts by volume of xylene (86 parts by weight), the mixture is heated to a temperature of 120° to 125° C. and stirred to be dissolved, and simultaneously PTFE powder having a particle diameter of 5 to 50 $\mu$m in an amount of 5 to 25% by weight to the weight of PTFE powder is added, and the liquid is cooled to a temperature of 40° C. or lower to form particles.

EAA resin (ethylene acrylic acid copolymer resin) concentration in xylene (density of 0.86) affects particle distribution of formed particles, concentration of 3 parts by weight or lower gives no change due to fine particle formation, and is further disadvantageous in production efficiency and economy. On the other hand, concentration exceeding 20 parts by weight gives larger particle diameter, but results in high solution viscosity, and the high solution viscosity results in difficult solid-liquid separation.

For good workability, the concentration of EAA resin to 100 volume parts of xylene ranges from 6 to 15 parts by weight.

The product particle may be dried at a temperature of 60° C. to 70° C. under a reduced pressure.

BRIEF DESCRIPTION OF THE DRAWING

These and other objects and many of the attendant advantages of the present invention will be readily appreciated as the same becomes better understood by reference to the following detailed description when considered in connection with the accompanying drawing; wherein.

DETAILED DESCRIPTION OF THE PREFERRED EMBODIMENT

Figure 1:
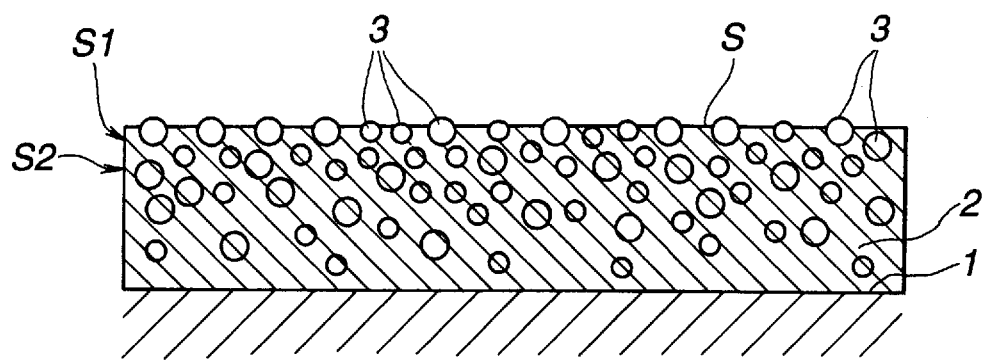
FIG. 1 shows a schematic cross-section of the coating of the present invention.

Now, a composite resin powder and manufacturing thereof for forming tetrafluoroethylene surface coating according to the present invention will be described hereinafter with reference to FIG. 1.

50 L of xylene (mixed xylene), 5 kg of EAA resin (Dow Chemical #3460), and 900 g of PTFE powder (Asahi-ICI Fluorochemical, L-169J, particle diameter range of 10 to 50 $\mu$m, average particle diameter of 15 $\mu$m) were charged in a stainless steel dissolver having a stirrer (100 L volume, with jacket) with stirring and the mixture was heated at a temperature of about 120° to 125° C. The heating was brought to a stop after heating for 1 hr and EAA was dissolved completely, the solution was cooled with stirring by switching the jacket from heating to water cooling to a temperature of 40° C. or lower to generate particles.

The solid was separated from the liquid using a hydraulic filter press and the recovered cake was dried using a vacuum dryer having a stirrer. Drying was carried out under the condition at a temperature of 63° to 70° C., degree of vacuum of 700 mmHgG, and stirring blade rotation speed of 2 rpm. The recovered powder product was classified and the fraction of 10 to 250 $\mu$m was obtained as the final product (total weight of 5.5 kg).

The coarse fraction of 250 $\mu$m or larger (about 400 g) and xylene recovered from the filter press and vacuum dryer were re-used in the next process.

TEST EXAMPLE 1

The above-mentioned product powder was further classified and powder fraction with a particle diameter of 15 to 250 $\mu$m (average particle diameter of 62 $\mu$m) was charged in a fluidization dipping bed.

A test piece of 50 mm×100 mm×2 mm stainless steel plate was subjected to pre-heating in a heating oven with the inside temperature of 350° C. for 10 min (surface temperature was about 290° C.) and then dipped in the fluidization dipping bed for 3 sec, and subjected to after-heat treatment at 230° C. for 1 min in an oven followed by cooling.

The coating thickness was 0.4 mm.

Fluorine to carbon ratio (F/C) of surface layers and middle layers of the formed coating were measured at various positions to obtain the result shown in Table 1 (result measured at five positions). The result shows that the PTFE concentration of surface layers is higher than that of middle layer.

For reference, the theoretical value is 9.00 to 10.00 if the entire surface is covered by PTFE particles.

TABLE 1

| measured position | No. 1 | No. 2 | No. 3 | No. 4 | No. 5 |
|---|---|---|---|---|---|
| surface layer | 2.67 | 2.88 | 2.64 | 2.46 | 3.13 |
| middle layer | 1.51 | 1.66 | 1.84 | 1.60 | 1.98 |

FIG. 1 shows a schematic diagram for illustrating PTFE particle distribution in the coating, 1 represents the metal surface, 2 represents EAA resin, 3 represents PTFE particle, $S_1$ represents the surface layer, and $S_2$ represents the middle layer.

TEST EXAMPLE 2

The above-mentioned product powder was classified to obtain the fraction with a particle diameter of 10 to 120 μm (average particle diameter of 30 to 50 μm), and the fraction was used for electrostatic spray coating.

The similar test piece to that used in the above-mentioned example was charged using an electrostatic charger of 50 kV, the above-mentioned powder was sprayed for about 4 sec for coating, and the coating was subjected to stoving at a treatment temperature of 250° C. for 4 min in a heating oven.

The coating thickness was 0.1 mm.

A comparative water repelling test by way of water drop test both on the sample coating and an EAA coating shows the definite difference in contact angle. The result suggests that more PTFE particles are distributed in the surface layer.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed as new and as desired to be secured by Letters Patent of the United States is:

1. A composite powder for double coating having a particle diameter of 10 to 300 μm as a whole and containing 5 to 25% by weight of PTFE powder having a particle diameter of 5 to 50 μm in EAA resin.

2. A method for manufacturing composite resin powder in which 3.0 to 20 parts by weight of EAA resin is added to 100 parts by volume of xylene (86 parts by weight), the mixture is heated at 120° to 125° C. with stirring to dissolve, simultaneously PTFE powder with a particle diameter of 5 to 50 μm is added in an amount of 5 to 25% by weight to that of said EAA resin, then the temperature of the mixture was cooled to a temperature of 40° C. or lower to generate particles followed by solid-liquid separation.

* * * * *